(12) United States Patent
Qin

(10) Patent No.: US 8,467,791 B2
(45) Date of Patent: Jun. 18, 2013

(54) METHOD, COMMUNICATION APPARATUS AND COMMUNICATION SYSTEM FOR HANDOVER PROCESSING

(75) Inventor: Yali Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/335,365

(22) Filed: Dec. 22, 2011

(65) Prior Publication Data

US 2012/0100858 A1    Apr. 26, 2012

Related U.S. Application Data

(63) Continuation of application No. PCT/CN2010/074223, filed on Jun. 22, 2010.

(30) Foreign Application Priority Data

Jun. 22, 2009 (CN) .......................... 2009 1 0146740

(51) Int. Cl.
*H04W 36/00* (2009.01)

(52) U.S. Cl.
USPC ........... 455/437; 455/433; 455/436; 455/439; 455/435.1; 455/435.2

(58) Field of Classification Search
USPC ................... 455/438, 437, 436, 435.1, 435.2, 455/439, 433
See application file for complete search history.

(56) References Cited

U.S. PATENT DOCUMENTS

| | | | |
|---|---|---|---|
| 2006/0171358 A1* | 8/2006 | Kangas et al. | 370/331 |
| 2007/0008926 A1 | 1/2007 | Oba | |
| 2008/0069050 A1* | 3/2008 | Dutta et al. | 370/331 |
| 2008/0123607 A1* | 5/2008 | Jokela | 370/338 |
| 2009/0168701 A1* | 7/2009 | White et al. | 370/328 |
| 2010/0046550 A1* | 2/2010 | Mammarappallil et al. | 370/474 |
| 2010/0322189 A1* | 12/2010 | Qiang | 370/331 |
| 2012/0115489 A1* | 5/2012 | Shuai et al. | 455/438 |

FOREIGN PATENT DOCUMENTS

| | | |
|---|---|---|
| CN | 1741668 A | 3/2006 |
| WO | WO 2006/055784 A2 | 5/2006 |
| WO | WO 2007/117824 A2 | 10/2007 |

OTHER PUBLICATIONS

International Search Report and Written Opinion of the International Searching Authority issued in corresponding PCT Patent Application No. PCT/CN2010/074223, mailed Oct. 8, 2010.

Office Action issued in corresponding Chinese Patent Application No. 200910146740.5, mailed Apr. 16, 2012.

(Continued)

*Primary Examiner* — Kamran Afshar
*Assistant Examiner* — Khalid Shaheed
(74) *Attorney, Agent, or Firm* — Brinks Hofer Gilson & Lione

(57) ABSTRACT

Embodiments of the present invention disclose a method, a communication apparatus and a communication system for handover processing. The method for handover processing includes: when a terminal having a capability of supporting an optimized handover and a non-optimized handover needs to be handed over from a first network to a second network, determining whether the terminal is incapable of performing an optimized handover, if it is determined that the terminal is incapable of performing the optimized handover, performing a non-optimized handover. The embodiments of the present invention further provide a communication apparatus and a communication system accordingly. The technical solutions enable a handover between different networks to be implemented in more scenarios.

6 Claims, 5 Drawing Sheets

OTHER PUBLICATIONS

3GPP, "3$^{rd}$ Generation Partnership Project; Technical Specification Group Services and System Aspects; Architecture Enhancements for non-3GPP Accesses" 3GPP TS 23.402. V8.0.0, Dec. 2007.

Office Action issued in corresponding Chinese Patent Application No. 200910146740.5, mailed Nov. 20, 2012.

Office Action issued in corresponding Russian Patent Application No. 2011153389/07, mailed Mar. 5, 2013.

* cited by examiner

METHOD, COMMUNICATION APPARATUS AND COMMUNICATION SYSTEM FOR HANDOVER PROCESSING

CROSS-REFERENCE TO RELATED APPLICATIONS

This application is a continuation of International Application No. PCT/CN2010/074223, filed on Jun. 22, 2010, which claims priority to Chinese Patent Application No. 200910146740.5, filed on Jun. 22, 2009, both of which are hereby incorporated by reference in their entireties.

FIELD OF THE INVENTION

The present invention relates to the field of communications technologies, and in particular to a method, a communication apparatus and a communication system for handover processing.

BACKGROUND OF THE INVENTION

Long term evolution (LTE, Long Term Evolution) is a new technology evolution direction introduced in communications technologies at present. A high rate packet data (HRPD, High Rate Packet Data) technology is applied in a code division multiple access (CDMA 2000, Code Division Multiple Access 2000) network to bear high-speed data services. Deployment of an LTE network as a newly established network is expanded gradually. At present, more frequently, the LTE network is used as a hot spot to cover and be superimposed on a conventional HRPD network. When a terminal performing a service enters an area without coverage of the LTE network and only with coverage of the HRPD network from an area with coverage of the LTE network, a handover from the LTE network to the HRPD network is needed, so as to avoid terminal service interruption.

At present, the handover from the LTE network to the HRPD network includes two types of handovers: an optimized handover and a non-optimized handover. For the non-optimized handover, the terminal has no capability of supporting the optimized handover, but the terminal may self-decide whether to perform the handover. However, for the optimized handover, the terminal is required to have the capability of supporting the optimized handover (for example, supporting a pre-registration process), and a network side indicates the terminal to perform the optimized handover. The terminal supporting the optimized handover needs to wait for an indication of the network side before performing operations; therefore, if a handover indication sent by an Evolved Node B (eNB) is not received by the terminal, a subsequent handover process is not started by the terminal.

The inventor finds that, in some scenarios, the prior art is failed to implement a handover from a first network (such as the LTE network) to another network (such as the HRPD network).

SUMMARY OF THE INVENTION

Embodiments of the present invention provide a method, a communication apparatus and a communication system for handover processing, so that a handover between different networks can be implemented in more scenarios.

An embodiment of the present invention provides a method for handover processing, which includes:

when a terminal having a capability of supporting an optimized handover and a non-optimized handover needs to be handed over from a first network to a second network, determining whether the terminal is incapable of performing an optimized handover, where in the optimized handover, authentication and authorization are accomplished before the terminal is handed over to the second network; and if it is determined that the terminal is incapable of performing the optimized handover, performing a non-optimized handover, where in the non-optimized handover, authentication and authorization are performed after the terminal is handed over to the second network.

An embodiment of the present invention provides a communication apparatus for handover processing, which includes:

a judging unit, configured to determine whether a terminal is incapable of performing an optimized handover when the terminal having a capability of supporting an optimized handover and a non-optimized handover needs to be handed over from a first network to a second network, where in the optimized handover, authentication and authorization are accomplished before the terminal is handed over to the second network; and a processing unit, configured to perform a non-optimized handover if the judging unit determines that the terminal is incapable of performing the optimized handover, where in the non-optimized handover, authentication and authorization are performed after the terminal is handed over to the second network.

An embodiment of the present invention provides a communication system, which includes the foregoing communication apparatus.

In the technical solutions according to the embodiments of the present invention, when a terminal having a capability of supporting an optimized handover and a non-optimized handover needs to be handed over from a first network to a second network, it is determined whether the terminal is incapable of performing an optimized handover. If it is determined that the terminal is incapable of performing the optimized handover, a non-optimized handover may be performed. Therefore, the technical solutions according to the embodiments of the present invention enable a handover between different networks to be implemented in multiple different scenarios, so that a terminal service can be maintained.

DETAILED DESCRIPTION OF THE EMBODIMENTS

Figure 1:
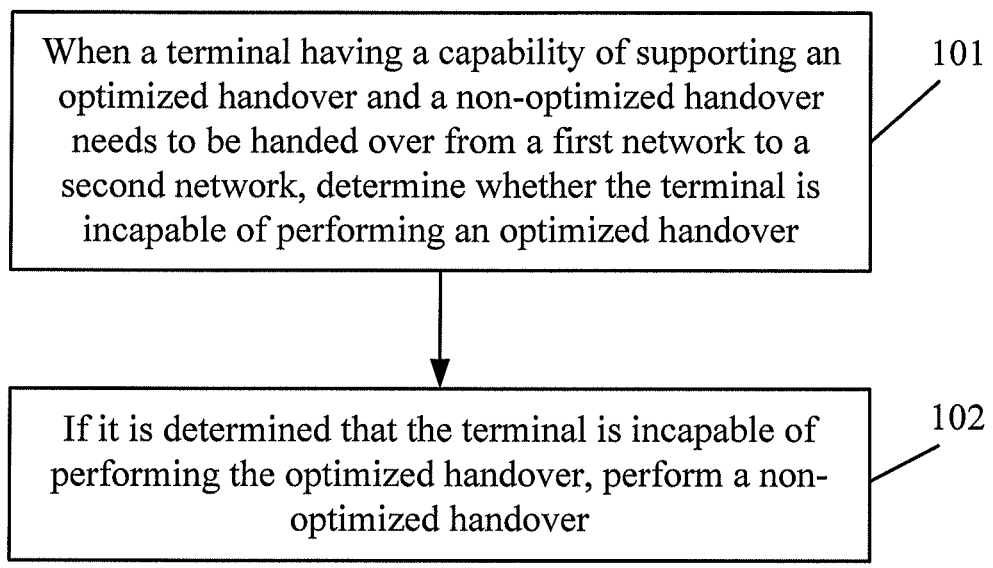
FIG. 1 is a schematic flow chart of a method for handover processing according to a first embodiment of the present invention.

Embodiments of the present invention provide a method, a communication apparatus and a communication system for handover processing, so that a handover between different networks can be implemented in more scenarios (for example, a pre-registration of a terminal is failed; the terminal is located in or roams to an LTE network, and an eNB of the LTE network has no capability of supporting an optimized handover).

The embodiments of the present invention involve an optimized handover and a non-optimized handover; and it is taken as an example that a first network is an LTE network and a second network is an HRPD network.

The optimized handover refers to that a signaling tunnel between the LTE network and the HRPD network is established through a shared core network; while still being located in the LTE network, the terminal can accomplish a process of pre-registration with the HRPD network through the signaling tunnel (the process includes authentication and authorization). After being handed over to the HRPD network, the terminal does not need to perform the authentication and authorization of the HRPD network again, thereby reducing a handover time delay. The optimized handover includes two stages: a pre-registration stage and a handover stage. A pre-registration refers to that the terminal first registers related information, such as information related to an air interface session negotiation and authorization information, to the HRPD network, so as to be used for performing the session negotiation, as well as authentication and authorization. In the pre-registration stage, the terminal registers the related information to the HRPD network according to a pre-registration indication delivered by an eNB (or may be referred to as eNode B) having the capability of supporting the optimized handover. For the handover stage, when the eNB decides that the terminal needs to be handed over, the eNB acquires pre-registration state information of the terminal. If the pre-registration of the terminal is successful, the eNB indicates the terminal to be handed over from the LTE network to the HRPD network; if the pre-registration of the terminal is failed, the process ends.

In the non-optimized handover, after being handed over to the HRPD network, the terminal needs to perform the authentication and authorization of the HRPD network again.

In the embodiments of the present invention, the terminal has the capability of supporting the optimized handover and the non-optimized handover simultaneously. The terminal having the capability of supporting the optimized handover indicates that the terminal supports the pre-registration. For a network side device, allowing the pre-registration indicates that the network side device has the capability of supporting the optimized handover, and not allowing the pre-registration generally indicates that the network side device has no capability of supporting the optimized handover.

Technical solutions of the embodiments of the present invention are respectively described in detail below.

FIG. 1 is a schematic flow chart of a method for handover processing according to a first embodiment of the present invention, which mainly includes the following steps.

Step 101: When a terminal having a capability of supporting an optimized handover and a non-optimized handover needs to be handed over from a first network to a second network, determine whether the terminal is incapable of performing an optimized handover, where in the optimized handover, authentication and authorization are accomplished before the terminal is handed over to the second network.

The determining whether the terminal is incapable of performing the optimized handover may include that: a network side determines that the terminal is incapable of performing the optimized handover according to that a pre-registration is not allowed in the first network; or, the network side determines that the terminal is incapable of performing the optimized handover according to that the pre-registration is allowed in the first network but the pre-registration of the terminal is failed.

The determining whether the terminal is incapable of performing the optimized handover may further include that: the terminal determines that the terminal is incapable of performing the optimized handover after knowing that a network side device in the first network allows the pre-registration but the pre-registration is failed; or, the terminal determines that the terminal is incapable of performing the optimized handover after knowing that the network side device in the first network does not allow the pre-registration.

Step 102: If it is determined that the terminal is incapable of performing the optimized handover, perform a non-optimized handover, where in the non-optimized handover, authentication and authorization are performed after the terminal is handed over to the second network.

The performing the non-optimized handover may include that: the network side delivers a notification message to the terminal, where the notification message indicates the terminal to perform the non-optimized handover according to a signal strength value and/or a signal quality value of a serving cell in the first network where the terminal is located and a signal quality value of a different system neighbor cell in the second network which are measured by the terminal.

The performing the non-optimized handover may include that: the terminal performs the non-optimized handover according to the signal strength value and/or the signal quality value of the serving cell in the first network where the terminal is located and the signal quality value of the different system neighbor cell in the second network which are measured.

The first network may be a long term evolution network, and the second network may be a high rate packet data network; alternatively, the first network may be a high rate packet data network, and the second network may be a long term evolution network. The first network and the second network may also be other system networks, which is not limited in the present invention. Accordingly, the network side device may be an eNB or other network elements.

It can be seen from content of the first embodiment that, when a terminal having a capability of supporting an optimized handover and a non-optimized handover needs to be handed over from a first network to a second network, it is determined whether the terminal is incapable of performing an optimized handover. If it is determined that the terminal is incapable of performing the optimized handover, a non-optimized handover may be performed. Therefore, the technical solution according to the embodiment of the present invention enables a handover between different networks to be implemented in multiple different scenarios, so that a terminal service can be maintained.

Specific application examples of the first embodiment are introduced in detail below, including a second embodiment, a third embodiment, and a fourth embodiment.

In the following embodiments, a first measurement indication message may be an A2 event measurement message; a first measurement report message may be an A2 event report message; a second measurement indication message may be a B1 event measurement message, and a second measurement report message may be a B1 event report message.

The second embodiment is mainly directed to a scenario that an eNB in an LTE network has no capability of supporting an optimized handover. The terminal may be located in the network or roams to the network.

Figure 2:
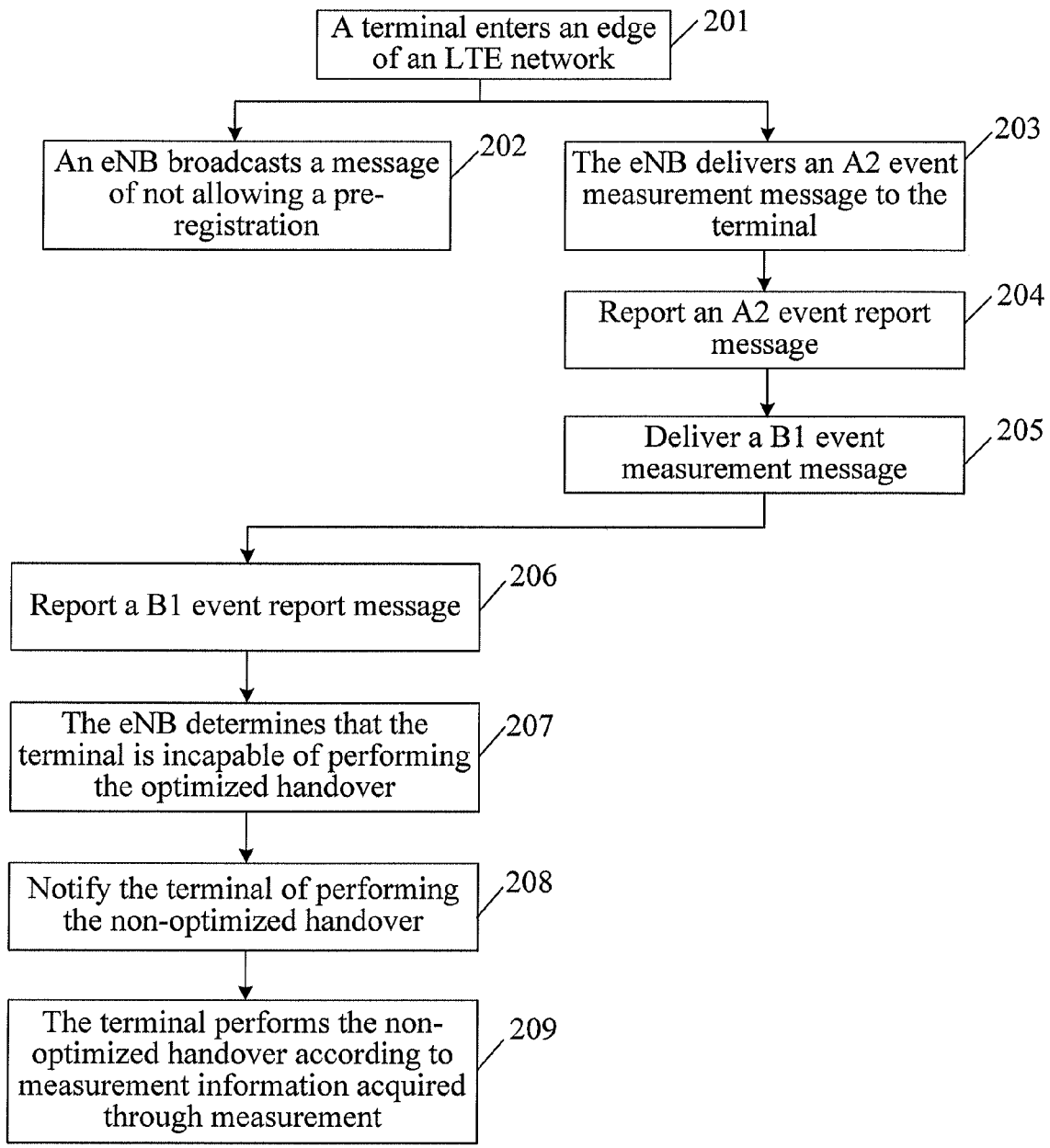
FIG. 2 is a schematic flow chart of a method for handover processing according to a second embodiment of the present invention.

FIG. 2 is a flow chart of a method for handover processing according to a second embodiment of the present invention, which mainly includes the following steps.

Step 201: A terminal enters an edge of an LTE network.

Step 202: An eNB in the LTE network broadcasts a message of not allowing a pre-registration.

The eNB of a serving cell where the terminal is located broadcasts the message of not allowing the pre-registration, which indicates that the eNB has no capability of supporting an optimized handover.

Step 203: The eNB delivers an A2 event measurement message to the terminal.

An A2 event refers to an event that a signal strength value and/or a signal quality value of the serving cell is smaller than a corresponding threshold value. The eNB delivers the A2 event measurement message. The A2 event measurement message may be used to indicate the terminal to measure the signal strength value and/or the signal quality value of the serving cell where the terminal is located, and compare the signal strength value and/or the signal quality value of the serving cell with a signal strength threshold value and/or a signal quality threshold value.

It should be noted that step 202 and step 203 do not have a necessary sequence.

Step 204: The terminal reports an A2 event report message according to a measurement result.

After receiving the message from the eNB, the terminal measures the signal strength value and/or the signal quality value of the serving cell. After it is measured that the signal strength value and/or the signal quality value of the serving cell where the terminal is located is smaller than the signal strength threshold value and/or the signal quality threshold value, the terminal reports the A2 event report message to the eNB.

Step 205: The eNB delivers a B1 event measurement message to the terminal.

A B1 event refers to an event that a signal quality value of a different system neighbor cell is greater than or equal to the signal quality threshold value. The eNB delivers the B1 event measurement message. The B1 event measurement message may be used to indicate the terminal to measure the signal quality value of the different system neighbor cell, and compare the signal quality value of the different system neighbor cell with the signal quality threshold value.

Step 206: The terminal reports a B1 event report message according to a measurement result.

After receiving the B1 event measurement message from the eNB, the terminal measures the signal quality value of an adjacent different system neighbor cell (for example, a serving cell of an HRPD network). When it is measured that the signal quality value of the different system neighbor cell is greater than or equal to the signal quality threshold value, the terminal reports the B1 event report message to the eNB.

The terminal in the embodiment of the present invention has a capability of supporting the optimized handover and non-optimized handover simultaneously, and therefore the terminal may interact with the HRPD network, measure the signal quality value of the serving cell in the HRPD network, and report the B1 event report message.

It should be noted that, when the terminal reports the B1 event report message, pre-registration state information of the terminal may also be carried. In a scenario where the pre-registration of the terminal is allowed, the pre-registration state information reported by the terminal is that the pre-registration is successful or failed; in a scenario where the pre-registration of the terminal is not allowed, the pre-registration state information reported by the terminal is that the terminal is incapable of performing the pre-registration. It is broadcast in step 202 in the embodiment of the present invention that the pre-registration is not allowed. Therefore, the B1 event report message reported by the terminal may carry the pre-registration state information of the terminal that the terminal is incapable of performing the pre-registration.

Step 207: The eNB determines that the terminal is incapable of performing the optimized handover.

After receiving the B1 event report message, the eNB decides that the terminal needs to be handed over from the LTE network to the HRPD network; if the terminal is not handed over from the LTE network to the HRPD network, services of the terminal may be interrupted. The eNB has already broadcast the message of not allowing the pre-registration, that is to say, the eNB has no capability of supporting the optimized handover in the network. Therefore, the eNB determines that the terminal is incapable of performing the handover according to an optimized handover process. In addition, the eNB may also know that the terminal is incapable of performing the pre-registration from the B1 event report message.

Step 208: The eNB notifies the terminal of performing the non-optimized handover.

In the embodiment of the present invention, in this situation, the eNB may notify the terminal of performing the non-optimized handover, namely performing the handover according to a non-optimized handover process.

Step 209: The terminal performs the non-optimized handover according to measurement information acquired through measurement.

After receiving a notification delivered by the eNB, the terminal knows that only the non-optimized handover can be performed. In addition, the terminal has already acquired the signal strength value and/or the signal quality value of the current serving cell and the signal quality value of the different system neighbor cell through measurement according to the indication of the eNB. Therefore, the non-optimized handover may be performed according to these parameters.

A procedure that the terminal performs the non-optimized handover may be performed according to the following process, which mainly includes the following.

The terminal determines to be handed over from the LTE network to the HRPD network, and initiates a connection establishment request to the HRPD network to establish a dedicated bearer in the HRPD network. A proxy mobile internet protocol (PMIP, Proxy MIP) tunnel is established between a serving gateway (S-GW, Serving Gate Way) in the LTE network where the terminal is located and a public data network gate way (Public Data Network Gate Way) in the HRPD network. Then the PDN-GW transits an end point of the other end of the PMIP tunnel of the terminal from the S-GW to an HSGW in the HRPD network, and notifies the HSGW of an IP address of the terminal in the LTE network. After the PDN-GW transits the end point of the PMIP tunnel to the HSGW, a resource release process is started to release resources occupied by the terminal at an LTE network side.

It can be seen from content of the second embodiment that, the terminal has the capability of supporting the optimized handover and non-optimized handover, after the eNB at the network side receives the B1 event report message sent by the terminal, the eNB decides that the terminal needs to be handed over from the LTE network to the HRPD network, and determines that the terminal is incapable of performing the optimized handover according to that the pre-registration is not allowed, and then the eNB indicates the terminal to perform the non-optimized handover. Therefore, when the terminal is located in or roams to the LTE network without the capability of supporting the optimized handover (at this time, the eNB does not allow the pre-registration), the non-optimized handover may be performed according to the indication of the eNB, so that the terminal service can be maintained, and the handover from the LTE network to the HRPD network can be implemented in more scenarios.

The third embodiment is mainly directed to a scenario that an eNB in an LTE network has a capability of supporting an optimized handover and a pre-registration of a terminal is failed.

Figure 3:
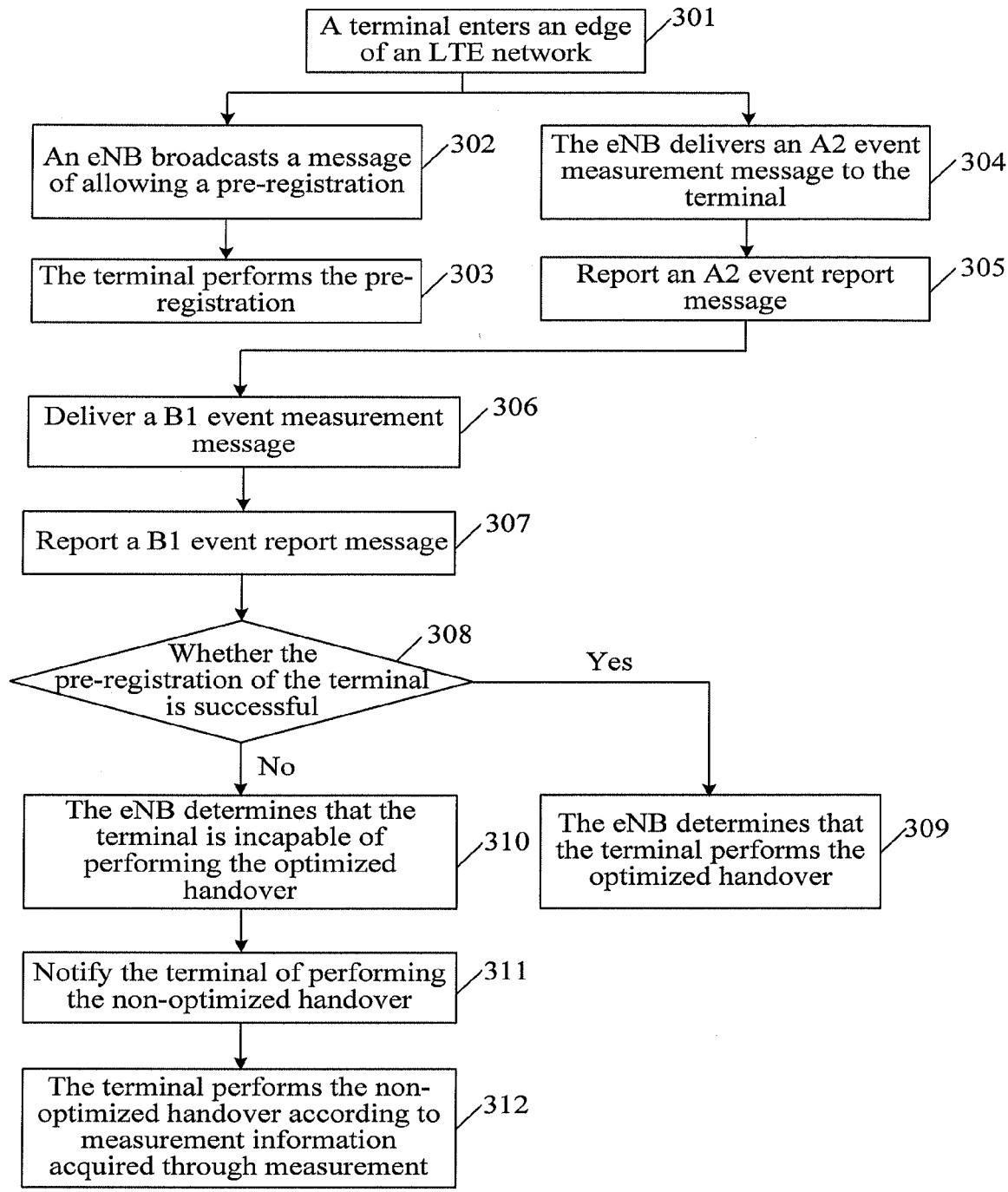
FIG. 3 is a schematic flow chart of a method for handover processing according to a third embodiment of the present invention.

FIG. 3 is a flow chart of a method for handover processing according to a third embodiment of the present invention, which mainly includes the following steps.

Step 301: A terminal enters an edge of an LTE network.

Step 302: An eNB in the LTE network broadcasts a message of allowing a pre-registration.

The eNB of a serving cell where the terminal is located broadcasts the message of allowing the pre-registration, which indicates that the eNB has a capability of supporting an optimized handover. The message broadcast by the eNB carries a pre-registration indication and related pre-registration information.

Step 303: The terminal performs the pre-registration.

After receiving the message broadcast by the eNB, the terminal may perform the pre-registration according to a conventional process. For example, the terminal pre-registers with an HRPD network according to the pre-registration indication and the related pre-registration information carried in the message broadcast by the eNB.

Step 304: The eNB delivers an A2 event measurement message to the terminal.

The eNB delivers the A2 event measurement message. The A2 event measurement message may be used to indicate the terminal to measure a signal strength value and/or a signal quality value of the serving cell where the terminal is located, and compare the signal strength value and/or the signal quality value of the serving cell with a signal strength threshold value and/or a signal quality threshold value.

It should be noted that step 302 and step 304 do not have a necessary sequence.

Step 305: The terminal reports an A2 event report message according to a measurement result.

After receiving the message from the eNB, the terminal measures the signal strength value and/or the signal quality value of the serving cell. After it is measured that the signal strength value and/or the signal quality value of the serving cell where the terminal is located is smaller than the signal strength threshold value and/or the signal quality threshold value, the terminal reports the A2 event report message to the eNB.

Step 306: The eNB delivers a B1 event measurement message to the terminal.

The eNB delivers the B1 event measurement message. The B1 event measurement message may be used to indicate the terminal to measure the signal quality value of a different system neighbor cell, and compare the signal quality value of the different system neighbor cell with the signal quality threshold value.

Step 307: The terminal reports a B1 event report message according to a measurement result.

After receiving the B1 event measurement message from the eNB, the terminal measures the signal quality value of an adjacent different system neighbor cell (for example, a serving cell of an HRPD network). When it is measured that the signal quality value of the different system neighbor cell is greater than or equal to the signal quality threshold value, the terminal reports the B1 event report message to the eNB.

The terminal in the embodiment of the present invention has a capability of supporting the optimized handover and non-optimized handover simultaneously, and therefore the terminal may interact with the HRPD network, measure the signal quality value of the serving cell of the HRPD network, and report the B1 event report message.

It should be noted that, when the terminal reports the B1 event report message, pre-registration state information of the terminal may also be carried. In a scenario where the pre-registration of the terminal is allowed, the pre-registration state information reported by the terminal is that the pre-registration is successful or failed; in a scenario where the pre-registration of the terminal is not allowed, the pre-registration state information reported by the terminal is that the terminal is incapable of performing the pre-registration.

In step 302 in the embodiment of the present invention, the message of allowing the pre-registration is broadcast; therefore, the B1 event report message reported by the terminal may carry the pre-registration state information of the terminal which is a result that the pre-registration is successful or failed.

Step 308: The eNB determines whether the pre-registration of the terminal is successful; if the pre-registration of the terminal is successful, the process proceeds to step 309; if the pre-registration of the terminal is failed, the process proceeds to step 310.

The eNB may know whether the pre-registration of the terminal is successful according to a message sent by the terminal in which a pre-registration result is reported during a registration process. In addition, if the B1 event report message reported by the terminal carries the pre-registration state information of the terminal, the eNB may also know the pre-registration state information of the terminal according to the B1 event report message reported by the terminal and determine whether the pre-registration of the terminal is successful.

Step 309: The eNB determines that the terminal performs the optimized handover.

If the eNB determines that the terminal may perform the optimized handover according to that the pre-registration of the terminal is successful, the terminal may be handed over from the LTE network to the HRPD network according to the conventional optimized handover process.

Step 310: The eNB determines that the terminal is incapable of performing the optimized handover.

The eNB decides that the terminal needs to be handed over from the LTE network to the HRPD network according to the received B1 event report message; if the terminal is not handed over from the LTE network to the HRPD network, services of the terminal may be interrupted. The pre-registration of the terminal is failed, and therefore the eNB determines that the terminal is incapable of performing the handover according to the optimized handover process.

Step 311: The eNB notifies the terminal of performing the non-optimized handover.

In the prior art, when the pre-registration of the terminal is failed, the handover cannot be performed, and the process ends. In the embodiment of the present invention, in this situation, the eNB may notify the terminal of performing the non-optimized handover, namely performing the handover according to a non-optimized handover process.

Step 312: The terminal performs the non-optimized handover according to measurement information acquired through measurement.

After receiving a notification delivered by the eNB, the terminal knows that only the non-optimized handover can be performed. In addition, the terminal has already acquired the signal strength value and/or the signal quality value of the current serving cell and the signal quality value of the different system neighbor cell through measurement according to the indication of the eNB. Therefore, the non-optimized handover may be performed according to these parameters.

Specifically, for a process of the terminal performing the non-optimized handover, reference may be made to descriptions in the second embodiment.

It can be seen from content of the third embodiment that, the terminal has the capability of supporting the optimized handover and non-optimized handover, after the eNB at the network side receives the B1 event report message sent by the terminal, the eNB decides that the terminal needs to be handed over from the LTE network to the HRPD network, and determines that the terminal is incapable of performing the optimized handover according to that the pre-registration is allowed but the pre-registration of the terminal is failed, and then the eNB indicates the terminal to perform the non-optimized handover. Therefore, when the pre-registration of the terminal is failed, the non-optimized handover may be performed according to the indication of the eNB, so that the terminal service is maintained, and the handover from the LTE network to the HRPD network can be implemented in more scenarios.

The fourth embodiment is also mainly directed to a scenario that an eNB in an LTE network has a capability of supporting an optimized handover. Unlike the second embodiment and the third embodiment in which an eNB decides that the terminal performs the non-optimized handover, in Embodiment 4, a terminal self-decides to perform a non-optimized handover.

Figure 4:
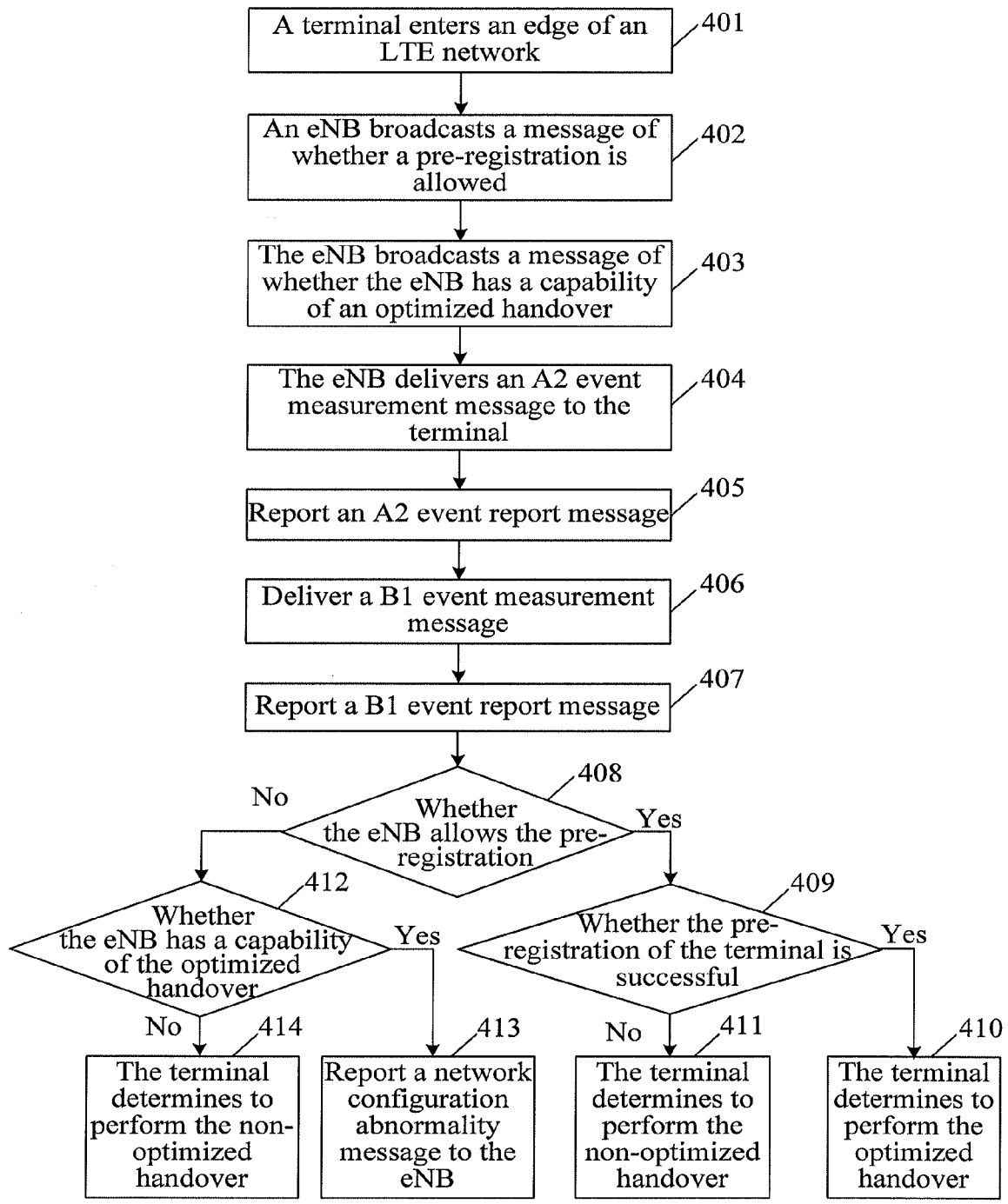
FIG. 4 is a schematic flow chart of a method for handover processing according to a fourth embodiment of the present invention.

FIG. 4 is a flow chart of a method for handover processing according to a fourth embodiment of the present invention, which mainly includes the following steps.

Step 401: A terminal enters an edge of an LTE network.

Step 402: An eNB in the LTE network broadcasts a message of whether a pre-registration is allowed.

Step 403: The eNB in the LTE network broadcasts a message of whether the eNB has a capability of an optimized handover.

Step 404: The eNB delivers an A2 event measurement message to the terminal.

The eNB delivers the A2 event measurement message. The A2 event measurement message may be used to indicate the terminal to measure a signal strength value and/or a signal quality value of the serving cell where the terminal is located, and compare the signal strength value and/or the signal quality value of the serving cell with a signal strength threshold value and/or a signal quality threshold value.

Step 405: The terminal reports an A2 event report message according to a measurement result.

After receiving the message from the eNB, the terminal measures the signal strength value and/or the signal quality value of the serving cell. After it is measured that the signal strength value and/or the signal quality value of the serving cell where the terminal is located is smaller than the signal strength threshold value and/or the signal quality threshold value, the terminal reports the A2 event report message to the eNB.

Step 406: The eNB delivers a B1 event measurement message to the terminal.

The eNB delivers the B1 event measurement message. The B1 event measurement message may be used to indicate the terminal to measure the signal quality value of a different system neighbor cell and compare the signal quality value of the different system neighbor cell with the signal quality threshold value.

Step 407: The terminal reports a B1 event report message according to a measurement result.

After receiving the B1 event measurement message from the eNB, the terminal measures the signal quality value of an adjacent different system neighbor cell (for example, a serving cell of an HRPD network). When it is measured that the signal quality value of the different system neighbor cell is greater than or equal to the signal quality threshold value, the terminal determines that a handover to the HRPD network is needed, and reports the B1 event report message to the eNB.

The terminal in the embodiment of the present invention has a capability of supporting the optimized handover and non-optimized handover simultaneously, and therefore the terminal may interact with the HRPD network, measure the signal quality value of the serving cell of the HRPD network, and report the B1 event report message.

It should be noted that, when the terminal reports the B1 event report message, pre-registration state information of the terminal may also be carried. In a scenario where the pre-registration of the terminal is allowed, the pre-registration state information of the terminal is that the pre-registration is successful or failed; in a scenario where the pre-registration of the terminal is not allowed, the pre-registration state information of the terminal is that the terminal is incapable of performing the pre-registration.

Step 408: The terminal determines whether the eNB allows the pre-registration according to the message broadcast by the eNB; if the pre-registration is allowed, the process proceeds to step 409; if the pre-registration is not allowed, the process proceeds to step 412.

The eNB has already broadcast the message of whether the pre-registration is allowed previously; therefore, the terminal may determine whether the eNB allows the pre-registration.

Step 409: The eNB determines whether the pre-registration is successful; if the pre-registration is successful, the process proceeds to step 410; if the pre-registration is failed, the process proceeds to step 411.

If in step 402, the eNB broadcasts a message of allowing the pre-registration, the terminal may perform the pre-registration according to the conventional process after receiving the message. If the message of allowing the pre-registration broadcast by the eNB carries a pre-registration indication and related pre-registration information, the terminal may pre-register with the HRPD network according to the pre-registration indication and the related pre-registration information carried in the message broadcast by the eNB.

Step 410: The terminal determines to perform the optimized handover.

The terminal determines that the optimized handover can be performed according to the successful pre-registration, and then the handover from the LTE network to the HRPD network may be performed according to the conventional optimized handover process.

Step 411: The terminal determines to perform the non-optimized handover.

The terminal determines that the optimized handover cannot be performed according to the failed pre-registration, and only the non-optimized handover can be performed. Then the terminal performs the handover according to a non-optimized handover process.

The terminal has already acquired the signal strength value and/or the signal quality value of the current serving cell and the signal quality value of the different system neighbor cell through measurement according to the indication of the eNB. Therefore, the terminal may perform the non-optimized handover according to these parameters.

For a process of the terminal performing the non-optimized handover, reference may be made to descriptions in the second embodiment.

Step 412: The terminal determines whether the eNB has a capability of the optimized handover according to the message broadcast by the eNB; if the eNB has the capability of the optimized handover, the process proceeds to step 413; if the eNB has no capability of the optimized handover, the process proceeds to step 414.

The eNB has broadcast the message of whether the eNB has the capability of the optimized handover previously. Therefore, the terminal may determine whether the eNB has the capability of the optimized handover.

Step 413: After determining not to perform the handover, the terminal reports a network configuration abnormality message to the eNB.

The terminal has already known that the eNB does not allow the pre-registration, and now knows that the eNB has the capability of the optimized handover according to the broadcast message. Therefore, the terminal determines not to perform the handover, considers that network configuration has an abnormality, and reports a network configuration abnormality message to the eNB. After receiving the message, the eNB may perform detection processing on whether the network configuration has an abnormality.

Step 414: The terminal determines to perform the non-optimized handover.

The terminal has already known that the eNB does not allow the pre-registration, thereby knowing that the eNB should not have the capability of the optimized handover; in addition, the terminal further confirms that the eNB has no capability of the optimized handover according to the broadcast message, thereby determining that the optimized handover cannot be performed and only the non-optimized handover can be performed. Then the terminal performs the handover according to the non-optimized handover process.

The terminal has already acquired the signal strength value and/or the signal quality value of the current serving cell and the signal quality value of the different system neighbor cell through measurement according to the indication of the eNB. Therefore, the terminal may perform the non-optimized handover according to these parameters.

Specifically, a process of the terminal performing the non-optimized handover, reference may be made to descriptions in the second embodiment.

It can be seen from the fourth embodiment that, the terminal has the capability of supporting the optimized handover and non-optimized handover. When the terminal detects that the handover from the LTE network to the HRPD network is needed, if the terminal knows that the eNB allows the pre-registration but the pre-registration of the terminal is failed, or knows that the network side device does not allow the pre-registration and the eNB has no capability of supporting the optimized handover, the terminal may perform the non-optimized handover according to the measurement information. Therefore, no matter whether the pre-registration of the terminal is failed, or the terminal is located in or roams to the LTE network that has no capability of supporting the optimized handover, the terminal can perform the non-optimized handover, so that the terminal service can be maintained, and the handover from the LTE network to the HRPD network can be implemented in more scenarios.

The method for handover processing according to the embodiment of the present invention is introduced in detail above, and accordingly, a communication apparatus for handover processing and a communication system for handover processing are provided below.

Figure 5:
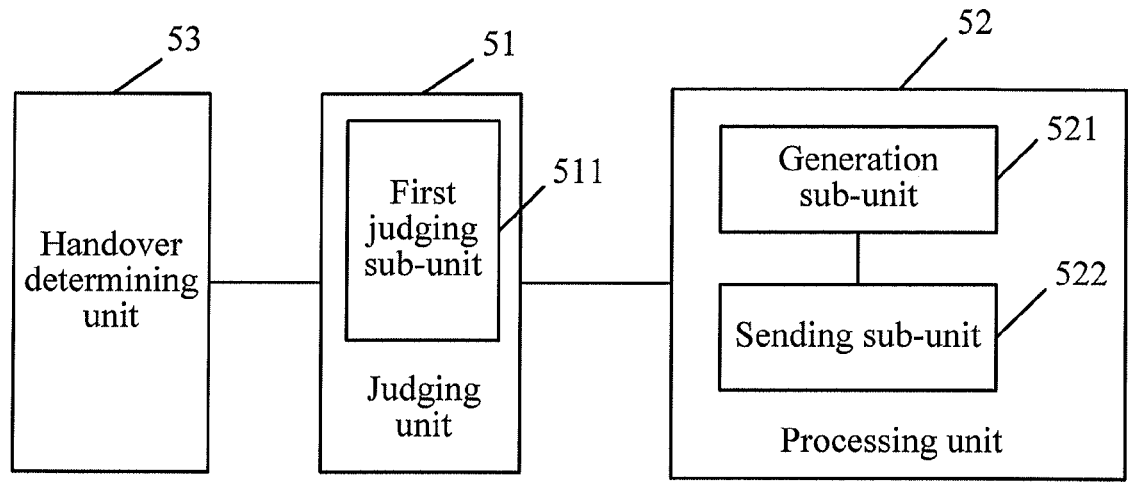
FIG. 5 is a schematic structure diagram of a first communication apparatus for handover processing according to an embodiment of the present invention.

FIG. 5 is a schematic structure diagram of a first communication apparatus for handover processing according to an embodiment of the present invention. The communication apparatus for handover processing may be an eNB.

As shown in FIG. 5, the communication apparatus for handover processing includes a judging unit 51 and a processing unit 52.

The judging unit 51 is configured to determine whether a terminal is incapable of performing an optimized handover when the terminal having a capability of supporting an optimized handover and a non-optimized handover needs to be handed over from a first network to a second network, where in the optimized handover, authentication and authorization are accomplished before the terminal is handed over to the second network.

The processing unit 52 is configured to perform a non-optimized handover when the judging unit 51 determines that the terminal is incapable of performing the optimized handover, where in the non-optimized handover, authentication and authorization are performed after the terminal is handed over to the second network.

The judging unit 51 includes a first judging sub-unit 511, configured to determine that the terminal is incapable of performing the optimized handover according to that the first network does not allow a pre-registration, or determine that the terminal is incapable of performing the optimized handover according to that the first network allows the pre-registration but the pre-registration of the terminal is failed.

The processing unit 52 includes a generation sub-unit 521 and a sending sub-unit 522.

The generation sub-unit 521 is configured to generate a notification message.

The sending sub-unit 522 is configured to deliver the notification message generated by the generation sub-unit 521 to the terminal, where the notification message indicates the terminal to perform the non-optimized handover according to a signal strength value and/or a signal quality value of a serving cell in the first network where the terminal is located and a signal quality value of a different system neighbor cell in the second network which are measured by the terminal.

The communication apparatus for handover processing may further include a handover determining unit 53.

The handover determining unit 53 is configured to deliver a first measurement indication message of measuring the signal strength value and/or the signal quality value of the serving cell in the first network where the terminal is located to the terminal; receive a first measurement report message reported by the terminal about that the signal strength value and/or the signal quality value of the serving cell in the first network where the terminal is located is smaller than a signal strength threshold value and/or a signal quality threshold value; deliver a second measurement indication message of measuring the signal quality value of the different system neighbor cell in the second network to the terminal; receive a second measurement report message reported by the terminal about that the signal quality value of the different system neighbor cell of the second network is greater than or equal to the signal quality threshold value; and decide that the terminal needs to be handed over from the first network to the second network according to the second measurement report message.

Figure 6:
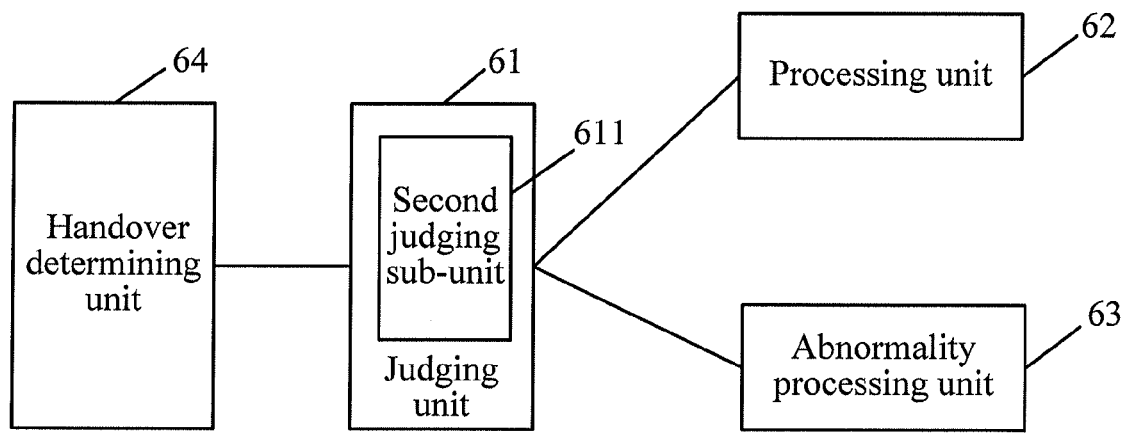
FIG. 6 is a schematic structure diagram of a second communication apparatus for handover processing according to an embodiment of the present invention.

FIG. 6 is a schematic structure diagram of a second communication apparatus for handover processing according to an embodiment of the present invention. The communication apparatus for handover processing may be a terminal.

As shown in FIG. 6, the communication apparatus for handover processing includes a judging unit 61 and a processing unit 62.

The judging unit 61 is configured to determine whether a terminal is incapable of performing an optimized handover when the terminal having a capability of supporting an optimized handover and a non-optimized handover needs to be handed over from a first network to a second network, where in the optimized handover, authentication and authorization are accomplished before the terminal is handed over to the second network.

The processing unit 62 is configured to perform a non-optimized handover when the judging unit 61 determines that the terminal is incapable of performing the optimized handover, where in the non-optimized handover, authentication and authorization are performed after the terminal is handed over to the second network.

The judging unit 61 includes a second judging sub-unit 611, which determines that the terminal is incapable of performing the optimized handover after knowing that a network side device of the first network allows a pre-registration but the pre-registration is failed, or determines that the terminal is incapable of performing the optimized handover after knowing that the network side device of the first network does not allow the pre-registration.

The processing unit 62 performs the non-optimized handover according to a signal strength value and/or a signal quality value of a serving cell in the first network where the terminal is located and a signal quality value of a different system neighbor cell of the second network which are measured.

The communication apparatus for handover processing may further include an abnormality processing unit 63.

The abnormality processing unit 63 is configured to determine not to perform the handover, and report a first network configuration abnormality message to the network side device when knowing that the network side device of the first network does not allow the pre-registration and the network side device has a capability of supporting the optimized handover.

The communication apparatus for handover processing may further include a handover determining unit 64.

The handover determining unit 64 is configured to receive a first measurement indication message of measuring the signal strength value and/or the signal quality value of the serving cell in the first network where the terminal is located which is delivered to the terminal by the network side; report a first measurement report message to the network side about that the signal strength value and/or the signal quality value of the serving cell in the first network where the terminal is located is smaller than a signal strength threshold value and/or a signal quality threshold value; receive a second measurement indication message of measuring the signal quality value of the different system neighbor cell in the second network that the network side delivers to the terminal; and decide that the terminal needs to be handed over from the first network to the second network after detecting that the signal quality value of the different system neighbor cell in the second network is greater than or equal to the signal quality threshold value, and report a second measurement report message about that the signal quality value of the different system neighbor cell in the second network is greater than or equal to the signal quality threshold value to the network side.

Figure 7:
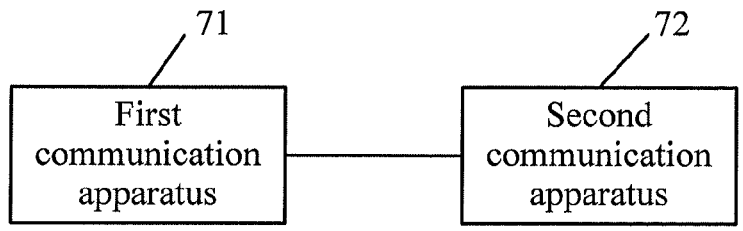
FIG. 7 is a schematic structure diagram of a communication system for handover processing according to an embodiment of the present invention.

FIG. 7 is a schematic structure diagram of a communication system for handover processing according to an embodiment of the present invention.

As shown in FIG. 7, the communication system for handover processing includes a first communication apparatus 71 and a second communication apparatus 72.

The first communication apparatus 71 is configured to determine whether a terminal is incapable of performing an optimized handover when the terminal having a capability of supporting an optimized handover and a non-optimized handover needs to be handed over from a first network to a second network, where in the optimized handover, authentication and authorization are accomplished before the terminal is handed over to the second network.

The second communication apparatus 72 is configured to perform a non-optimized handover when the first communication apparatus 71 determines that the terminal is incapable of performing the optimized handover, where in the non-optimized handover, authentication and authorization are performed after the terminal is handed over to the second network.

The first communication apparatus 71 may be an eNB, and the second communication apparatus 72 may be a terminal. That is, a network side device and a terminal accomplish the handover process in cooperation.

Alternatively, both the first communication apparatus 71 and the second communication apparatus 72 may be a part of a network side device (such as an eNB), the network side device (such as an eNB) may have the structure shown in FIG. 5, and reference may be made to the previous descriptions.

Further alternatively, both the first communication apparatus 71 and the second communication apparatus 72 may be a part inside a terminal, and may have the structure shown in FIG. 6 when the first communication apparatus 71 and the second communication apparatus 72 are terminals.

For further detailed operation processes between the first communication apparatus 71 and the second communication apparatus 72, reference may be made to the previous descriptions of the second embodiment to the fourth embodiment, and details are not described here again.

In conclusion, in the technical solutions according to the embodiments of the present invention, when a terminal having a capability of supporting an optimized handover and a non-optimized handover needs to be handed over from a first network to a second network, it is determined whether the terminal is incapable of performing an optimized handover. If it is determined that the terminal is incapable of performing the optimized handover, a non-optimized handover may be performed. Therefore, the technical solutions according to the embodiments of the present invention enable a handover between different networks to be implemented in multiple different scenarios, so that a terminal service can be maintained.

Persons of ordinary skill in the art may understand that all or a part of the steps of the methods according to the embodiments may be implemented by a program instructing relevant hardware. The program may be stored in a computer readable storage medium, and the storage medium may include a read only memory (ROM, Read Only Memory), a random access memory (RAM, Random Access Memory), a magnetic disk, or an optical disk.

A method, a communication apparatus and a communication system for handover processing according to the embodiments of the present invention are introduced in detail above.

Specific cases are used for illustrating principles and implementations of the present invention. The above descriptions of the embodiments are merely for understanding the method and core ideas of the present invention. Meanwhile, persons of ordinary skill in the art may make modifications to the specific implementations and application ranges according to the idea of the present invention. In conclusion, the content of the specification shall not be regarded as a limitation to the present invention.

What is claimed is:

1. A method for handover processing, comprising:

when a terminal having a capability of supporting an optimized handover and a non-optimized handover needs to be handed over from a long term evolution network to a high rate packet data network, determining by whether the terminal is incapable of performing an optimized handover, wherein in the optimized handover, authentication and authorization are accomplished before the terminal is handed over to the high rate packet data network, and the determining whether the terminal is incapable of performing the optimized handover comprises: if a network side device of the long term evolution network does not allow a pre-registration of the terminal, determining, by the network side device of the long term evolution network, that the terminal is incapable of performing the optimized handover; or if the network side device of the long term evolution network allows the pre-registration of the terminal but the pre-registration of the terminal is failed, determining, by the network side device of the long term evolution network, that the terminal is incapable of performing the optimized handover; and if it is determined that the terminal is incapable of performing the optimized handover, performing a non-optimized handover, wherein in the non-optimized handover, authentication and authorization are performed after the terminal is handed over to the high rate packet data network.

2. The method for handover processing according to claim 1, wherein the performing the non-optimized handover comprises:

delivering, by the network side device of the long term evolution network, a notification message to the terminal, wherein the notification message indicates the terminal to perform the non-optimized handover according to a signal strength value and/or a signal quality value of a serving cell in the long term evolution network wherein the terminal is located and a signal quality value of a neighbor cell in the high rate packet data network which are measured by the terminal.

3. The method for handover processing according to claim 1, wherein the method further comprises:

delivering a first measurement indication message of measuring the signal strength value and/or the signal quality value of the serving cell in the long term evolution network wherein the terminal is located to the terminal;

receiving a first measurement report message reported by the terminal;

if the first measurement report message indicates that the signal strength value of the serving cell in the long term evolution network wherein the terminal is located is smaller than a signal strength threshold value, or the signal quality value of the serving cell in the long term evolution network wherein the terminal is located is smaller than a signal quality threshold value, delivering a second measurement indication message to the terminal, wherein the second measurement indication message indicates the terminal to measure the signal quality value of the neighbor cell in the high rate packet data network;

receiving a second measurement report message reported by the terminal; and if the second measurement report message indicates that the signal quality value of the neighbor cell in the high rate packet data network is greater than or equal to the signal quality threshold value, deciding that the terminal needs to be handed over from the long term evolution network to the high rate packet data network.

4. A network side device of a long term evolution network for handover processing, comprising:

a first judging sub-unit, configured to determine that a terminal having a capability of supporting an optimized handover is incapable of performing an optimized handover if the long term evolution network does not allow a pre-registration of the terminal, or determine that the terminal is incapable of performing the optimized handover if the long term evolution network allows the pre-registration of the terminal but the pre-registration of the terminal is failed, and a non-optimized handover needs to be handed over from the long term evolution network to a high rate packet data network, wherein in the optimized handover, authentication and authorization are accomplished before the terminal is handed over to high rate packet data network; and a processing unit, configured to perform a non-optimized handover if the judging unit determines that the terminal is incapable of performing the optimized handover, wherein in the non-optimized handover, authentication and authorization are performed after the terminal is handed over to the high rate packet data network.

5. The communication apparatus according to claim 4, wherein the processing unit comprises:

a generation sub-unit, configured to generate a notification message; and a sending sub-unit, configured to deliver the notification message generated by generation sub-unit to the terminal, wherein the notification message indicates the terminal to perform the non-optimized handover according to a signal strength value and/or a signal quality value of a serving cell in the long term evolution network wherein the terminal is located, and a signal quality value of a neighbor cell in the high rate packet data network which are measured by the terminal.

6. A communication system for handover processing, comprising the network side device according to claim 4.

* * * * *